(12) United States Patent
Sampath et al.

(10) Patent No.: US 8,121,964 B2
(45) Date of Patent: Feb. 21, 2012

(54) STATE MACHINE METHOD FOR EDITING REQUIREMENTS USING TRANSITION SYSTEMS, A SUB-STATE MECHANISM, AND A PARTIAL BEHAVIORS MECHANISM IN ORDER TO REDUCE COMPLEXITY AND THE NUMBER OF STATES

(75) Inventors: Prahladavaradan Sampath, Bangalore (IN); Ramesh Sethu, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 726 days.

(21) Appl. No.: 12/334,089

(22) Filed: Dec. 12, 2008

(65) Prior Publication Data

US 2010/0152948 A1 Jun. 17, 2010

(51) Int. Cl.
*G06F 17/00* (2006.01)
(52) U.S. Cl. ........................................................ 706/45
(58) Field of Classification Search ............... 706/45–48
See application file for complete search history.

(56) References Cited

U.S. PATENT DOCUMENTS

| | | | |
|---|---|---|---|
| 5,652,714 A * | 7/1997 | Peterson et al. | 702/57 |
| 5,801,687 A * | 9/1998 | Peterson et al. | 715/201 |
| 7,505,951 B2 * | 3/2009 | Thompson et al. | 706/45 |
| 7,627,570 B2 * | 12/2009 | Bosloy et al. | 1/1 |

OTHER PUBLICATIONS

Sakharov, A Hybrid State Mchine Notation for Component Specification, 2000, SIGPLAN, pp. 1-7.*

* cited by examiner

*Primary Examiner* — David Vincent
(74) *Attorney, Agent, or Firm* — John A. Miller; Miller IP Group, PLC

(57) ABSTRACT

A method for providing writing requirements for a structured transition system employing state machines. The requirements employ a plurality of structuring mechanisms, namely, sub-state based structuring, abstraction based structuring and partial behavior structuring that uses event sequences. The sub-state based structuring has to do with the hierarchical requirements of the state machines, abstraction based structuring provides an abstraction of the state machines that reduces the number of states, and partial behavior structuring looks at certain states to predict how those states will affect other states.

19 Claims, 3 Drawing Sheets

STATE MACHINE METHOD FOR EDITING REQUIREMENTS USING TRANSITION SYSTEMS, A SUB-STATE MECHANISM, AND A PARTIAL BEHAVIORS MECHANISM IN ORDER TO REDUCE COMPLEXITY AND THE NUMBER OF STATES

BACKGROUND OF THE INVENTION

1. Field of the Invention

This invention relates generally to a method for providing writing requirements for a structured transition system and, more particularly, to a method for providing writing requirements for a structured transition system that employs sub-state based structuring, abstraction based structuring and partial behavior structuring.

2. Discussion of the Related Art

Sophisticated digital circuitry, such as circuits and controllers that control various vehicle systems, sub-systems and components, typically employ state machines that provide a certain state or states based on inputs from various sensors and other state machines indicating the operating condition of the vehicle. For example, the various sensors, detectors and components on a vehicle that detect various vehicle parameters, such as pressures, temperatures, steering angle, yaw rate, vehicle speed, wheel slip, etc., are provided to state machines that indicate a particular state of the functional operation of the vehicle. Because a vehicle may at any given point have thousands of states, providing writing requirements that allow such a large number of states to be understood by a person who is designing vehicle circuits and systems is typically a complex challenge.

Requirements capture and analysis is one of the most critical stages of the software development life cycle. One known practice is to use natural language as a technique for specifying feature requirements. However, using natural language for specifying feature requirements does not lend itself to automated informal analysis of the requirement. Another known practice is to use graphical state-machine formalisms for specifying feature requirements. This technique employs hierarchical structuring mechanisms for designing state machines. Hierarchical state based structuring helps a user manage complexity of requirements by providing a mechanism for grouping states and transitions. However, using such structuring mechanisms introduces implicit information, making it difficult for a user to comprehend all of the implications of making changes in a specification. Thus, it is sometimes difficult to validate the specification, i.e., figure out whether what has been written down as the writing requirements is what really was intended.

SUMMARY OF THE INVENTION

In accordance with the teachings of the present invention, a method is disclosed for providing writing requirements for a structured transition system employing state machines. The requirements employ a plurality of structuring mechanisms, namely, sub-state based structuring, abstraction based structuring and partial behavior structuring that uses event sequences. Sub-state based structuring allows users to focus on a sub-set of states of the state machine, and abstraction based structuring allows users to specify requirements by conflating different states, i.e., focusing on a particular aspect of the specifications by ignoring differences between states irrelevant to that aspect. This provides an abstraction of the state machine that reduces the number of states. Partial behavior structuring allows specification of transitions by using scenarios consisting of a sequence of inputs and outputs to partially specify the source and target states of the transition.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for providing writing requirements in a structured transition system employing state machines is merely exemplary in nature, and is no way intended to limit the invention or its application or uses.

The present invention proposes a technique for providing writing or feature requirements in a structured transition system (STS) that employs state machines. A transition is the movement of a state machine from one state to another state. A transition has four components, namely, a starting state, an ending state, an event and an action. Semantics is a procedure for compiling a high level description within the STS. In other words, semantics describe how the compilation is accomplished.

Figure 1:
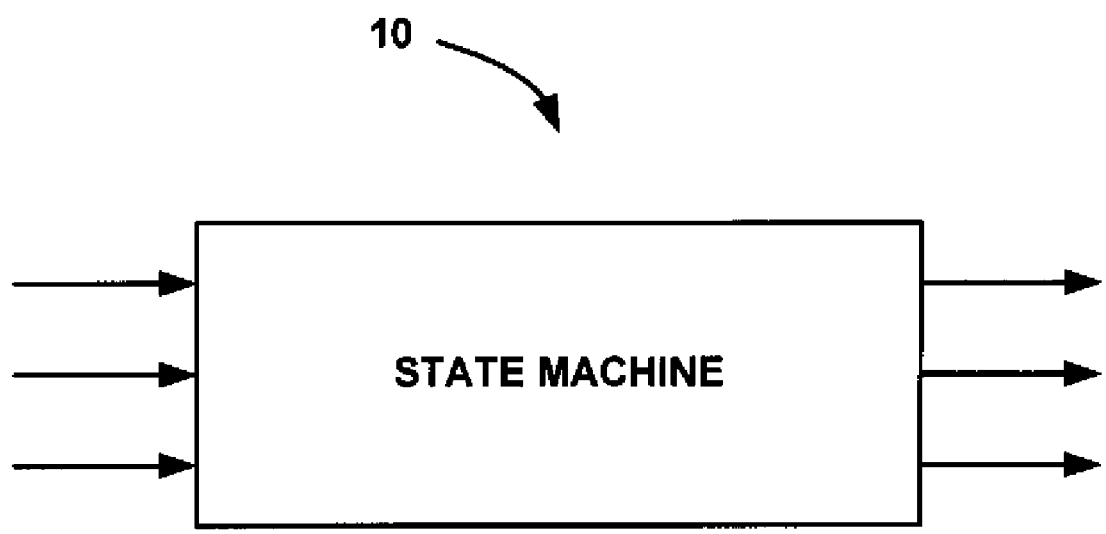
FIG. 1 is a block diagram of a state machine.

FIG. 1 is a representation of a state machine 10 receiving state inputs from other state machines or systems, and providing state outputs based on the state inputs. A state machine has two parts, namely, a set of states and a set of transitions.

The proposed STS language provides a formalism that can be used for capturing high-level writing requirements in the form of transition systems. The described method provides structuring mechanisms that include requirements for sub-state based structuring, abstraction based structuring and partial behavior structuring. Sub-state based structuring has to do with the hierarchical requirements of the state machines, abstraction based structuring provides an abstraction of the state machines that reduces the number of states and partial behavior structuring employs scenarios to specify starting and ending states of a transition. Particularly, sub-state based structuring allows users to focus on a sub-set of states of the state machine, and abstraction based structuring allows users to specify requirements by conflating different states, i.e., focusing on a particular aspect of the specifications by ignoring differences between states irrelevant to that aspect. This provides an abstraction of the state machine that reduces the number of states. Partial behavior structuring allows specification of transitions by using scenarios consisting of a sequence of inputs and outputs to partially specify the source and target states of the transition.

The method also may employ another structuring mechanism defined as state machine decomposition that refers to reducing the complexity of a large state machine into smaller inter-related state machines so that they can be isolated.

The discussion below provides a preliminary design of the syntax and semantics of the STS specification. The STS specification it is expected to evolve to include further structuring mechanisms based on continuing research. The syntax and semantics presented below can be used for designing analysis algorithms for consistency of the STS specifications, completeness of the STS specifications and predicate abstraction of STS specifications.

The syntax of the STS specification is first discussed. An STS specification consists of a structured sequence of declarations. There are a number of different kinds of declarations, including type, variable, event, action, invariant, initialization and transition declarations. Of these declaration kinds, the STS specification mainly focuses on structuring the transition declarations. The other declarations are assumed to precede the transition declarations and are visible globally in the STS specification. This is only a temporary restriction on the language. It is possible that all degradations can be freely intermixed, however, certain semantics become more complex if variables and input/output events are not assumed to be global.

The transition declarations are organized using one of the following syntax elements. A sub-space specification syntax element that describes transition behavior with respect to a set of states defined using a predicate. This is typical of graphical hierarchical state machines, where the hierarchy represents the behavior within a particular state. An abstraction syntax element specifies the transition behavior of the state-machine after undergoing abstraction.

Each transition itself specifies a set of source states and target states, an event on which the transition should be taken and an action that should be performed by the transition. The source and target states can be specified as follows. The keyword init can be used to refer to the set of initial-states of the transition system. A state predicate over the variables of the state-space can be used to specify a set of states. A post image is the set of states reached by a sequence of transitions starting from a given set of states. A pre-image is a set of states starting from which a sequence of transitions will reach a given set of target states. A sequence of transitions are specified as a sequence of events and actions.

Figure 2A:
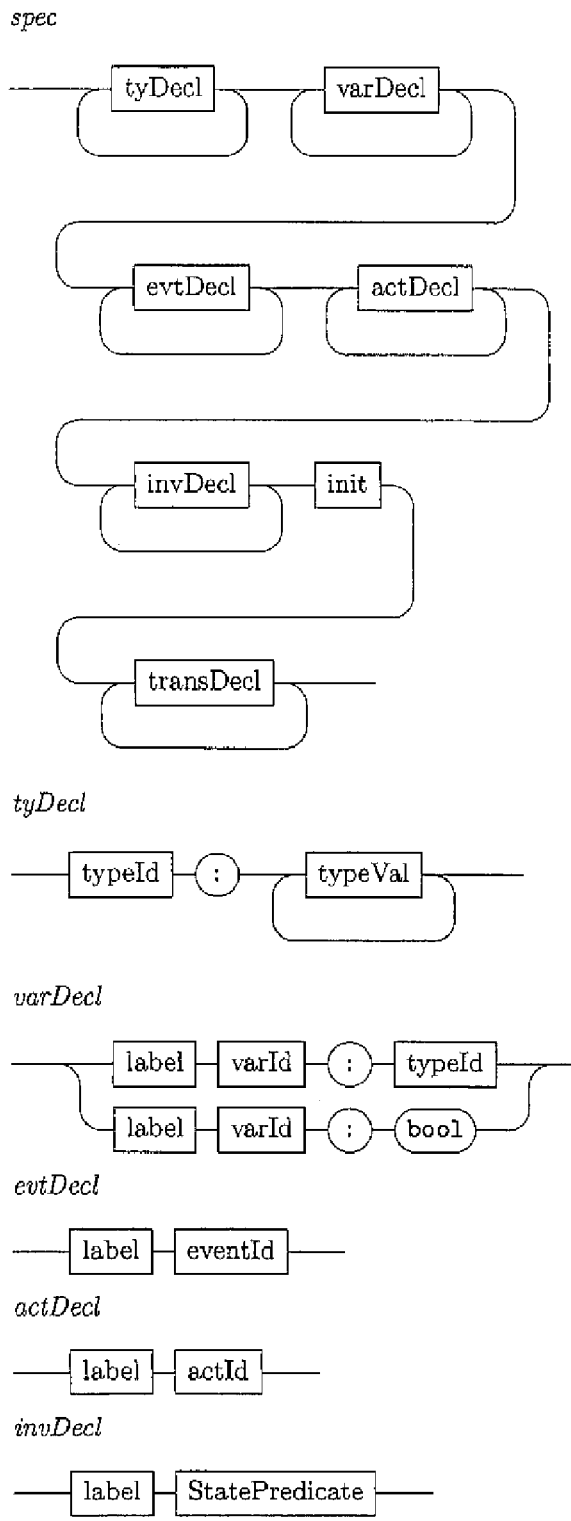
FIGS. 2a and 2b show a syntax diagram for a STS specification.
Figure 2B:
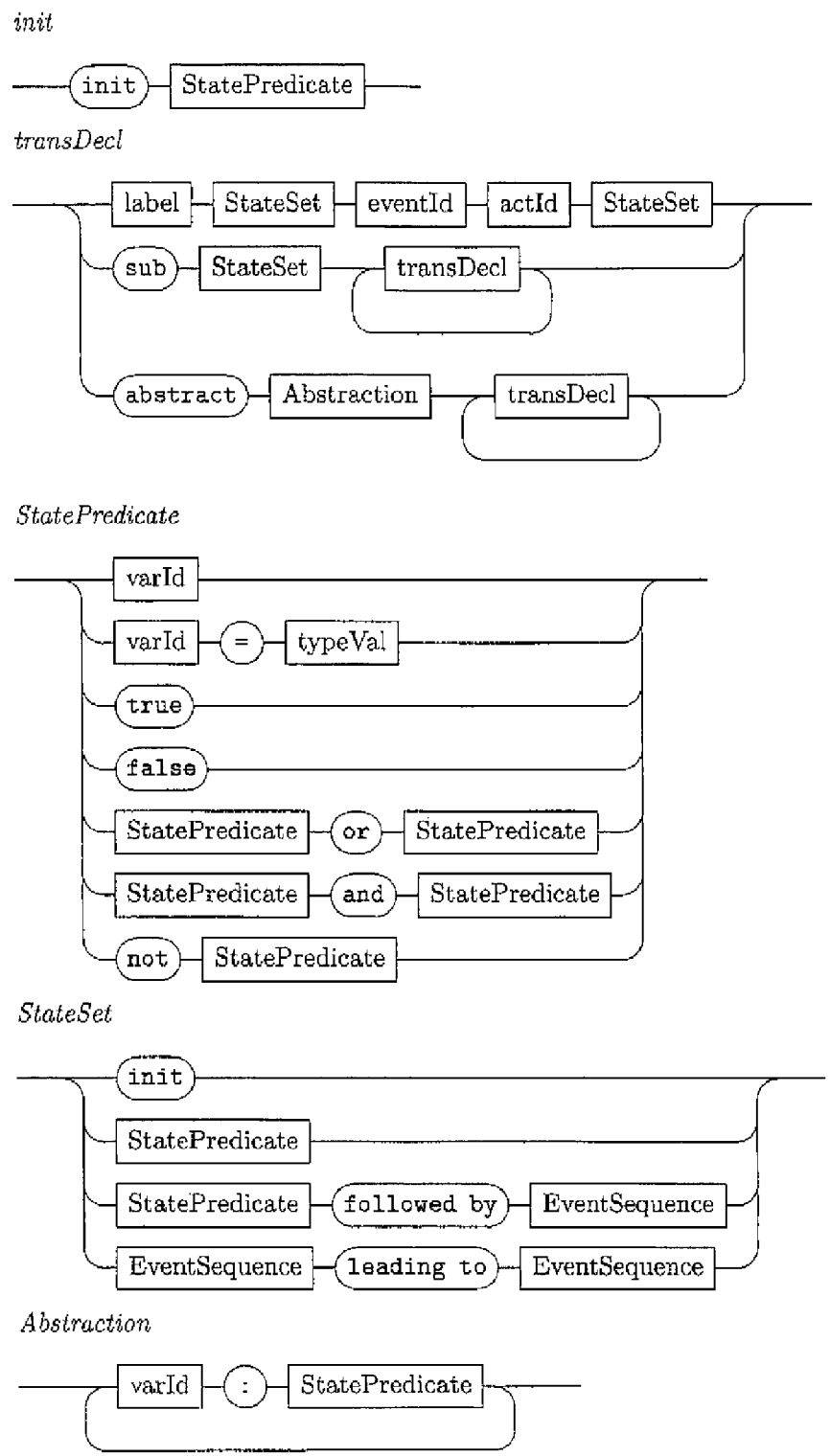

Table I below shows lines of code that represent the syntax, using grammar specification in Extended Backus-Naur form (EBNF), of the STS specification discussed above using the sub-space specification syntax elements and the over-approximation syntax elements, and the source and target states including the initial states, the state predicate, the post image of a sequence of events and the pre-image of a sequence of events. FIGS. 2a and 2b show the lines of code in Table I in a syntax diagram.

TABLE I (STS spec)::=⇒
(Type declaration)*(Variable declaration)*
(Event declaration)*(Action declaration)*
(Invariant declaration)*(Initializing)
(Type declaration)::=⇒
(type-id)(type-val)*
(Variable declaration)::=⇒
(type-id) : (type-id)|
(var-id) : bool
(Event declaration)::=⇒
(event-id)
(Action declaration)::=
(action-id)
(Invariant declaration)::=
(label) (State predicate)
(Transition declaration)::=
(label)(State set)(event-id)(action-id)(State set)|
sub (State set)(Transition declaration)*|
abstract (Abstraction)(Transition declaration)*
(Event sequence)::=
(event-id)*
(State set)::=
init|
(State predicate)|
(State predicate)→(Event sequence)|
(Event sequence)←(State predicate)

TABLE I-continued (Abstraction)::=⇒
((var-id) : (State predicate))+

The following discussion gives the semantics of the STS specification presented above. The semantics is presented as axiomatic semantics that sets up relationships between transition systems and STS specifications. This style of presenting the semantics is commonly used for presenting the semantics of logics, such as LTL, CTL, etc.

The models of a structured transition system are transition systems. A transition system can be presented by the tuple:

$$\langle S, \sum\nolimits^{Evt}, \sum\nolimits^{Act}, Init, \delta \rangle$$

Where S is a finite set of states of the state-machine, $\Sigma^{Evt}$ is the set of input events, $\Sigma^{Act}$ is the set of output actions Init $\subset$ S is the set of initial states, and $\delta$ is a relationship of type $S \times \Sigma^{Evt} \times \Sigma^{Act} \times S$, which represents the state transition relation. The notation $\Theta$ is used to refer to a transition system. The notations $S_\Theta$, $\Sigma_\Theta^{Evt}$, $\Sigma_\Theta^{Act}$, $Init_\Theta$, $S_{73}$ are used to refer to the different components of the transition system.

An STS specification can be separated into two main parts, namely, a static part that consists of the type of declaration, such as variable declarations, initialization of declarations, invariant declarations, event declarations and action declarations, and a dynamic part that consists of the different forms of the transition declarations. The static part of an STS specification identifies the states, events, actions and initial states of a transition system, and the dynamic part of an STS specification identifies the transition relation part of a transition system. The static part of an STS specification is identified as a universe of transition systems that has the identified set of states, events, actions and initial states. The dynamic part of the specification identifies transition systems from this universe based on properties that their transition relation should satisfy.

For static semantics, the set of states of the transition system are structured as assignments of values to variables and conditions. It can therefore be represented by an indexed tuple of values, where each index corresponds to a particular state-variable. The index-set of a state is the set of variable declarations in the specification.

Given a type ty, the domain dom(ty) of the type ty is the set of valuations for variables of that type. A valuation is a mapping from a variable name to a value. Given a variable v, the type of the variable is given by type(v). Given a set of variables V, the state-space described by this set of variables is given as:

$$[\![V]\!] =_{x_{v \in V}} [dom(type(v))]$$

The invariant declarations of a specification also contribute towards defining the state-space of the transition system. An invariant is defined by a predicate that has to be satisfied by all of the states of a transition system. Given a set of variables V, the denotation of the predicate expression pred, written $[\![pred]\!]v$, with respect to this set of variables, is a unitary predicate over the set of states $[\![V]\!]$. It is noted that the semantics of a predicate expression is parameterized over a set of variables V.

Given a set of invariants Inv in the specification, the state-space of the transition-system described by the specification is given as:

$$[\![Inv]\!]V = \left\{ s \in [\![V]\!] \,\middle|\, \bigwedge_{i \in Inv} [\![i]\!]V(s) \right\}$$

Equivalently, the semantics can be expressed as:

$$[\![Inv]\!]V = \bigcap_{i \in Inv} [\![i]\!]V$$

Where $[\![i]\!]v$, which is an unitary predicate over $[\![V]\!]$ interpreted as a subset of $[\![V]\!]$.

Similarly, the initialization clause of the specification is described by a state-predicate, and the set of states described by the initialization predicate init is given by $[\![init]\!]V$.

The set of event and action declarations define two sets $\Sigma^{Evt}$ and $\Sigma^{Act}$ of events and actions, respectively.

Given a specification Spec with variables V, invariants Inv, initialization predicate init, events Evt and actions Act, the static-semantics specifies a set (the universe) of transition systems $[\![Spec]\!]$ as follows.

$$[\![Spec]\!] = \langle Inv_V, \sum\nolimits^{Evt}, \sum\nolimits^{Act}, [\![init]\!]_V, \delta \rangle$$

Where $\delta$ is the relation:

$$\delta \subseteq [\![Inv]\!]_V \times \sum\nolimits^{Evt} \times \sum\nolimits^{Act} \times [\![Inv]\!]_V$$

Event sequences are an important abstraction for specifying the behavior of a feature. Behavior is often specified in terms of sequences of events. In these cases, sequences of events implicitly represent sets of states. For example, a common idiom for specifying requirements is from a state satisfying condition 1, after event 1, event 2, event 3 has occurred, if event 4 occurs, then perform action 1. In this case, a sequence of events is a convenient representation of the set of states reachable by processing the sequence of events from some initial set of states.

The STS language allows a specification of state-sets using event-sequences. A set of states can be specified as the states reachable from an initial set of states by processing a given event sequence as:

$$\text{pre} \to \langle seq \rangle$$

This basically represents the post—image of the given sequence with respect to a transition relation and a set of states.

Given a transition relationship $\delta$, the relation $\delta^*$ is defined as the natural extension of the transition relationship $\delta$ to sequences of events as:

$$\delta^* = \left\{ (s, e_0 \ldots e_n, a_0 \ldots a_n, s') \,\middle|\, \exists_{0 \leq i \leq n} s'_i \cdot (s = s'_0) \wedge (s'_{n+1} = s') \wedge \bigwedge_{0 \leq i \leq n} (s'_i, e_i, a_i, s'_{i+1}) \in \delta \right\}$$

Given a transition relation $\delta$, the set of states represented by:

$$\text{pre} \to \langle e_0 \ldots e_n \rangle$$

is given as:

$$[\![\text{pre} \to \langle e_0 \ldots e_n \rangle]\!] = \{ s' \in [\![Inv]\!] \mid \exists_s \in [\![\text{pre}]\!] \cdot \exists a_0 \ldots a_n \cdot \delta^*(s, e_0 \ldots e_n, a_0 \ldots a_n, s') \}$$

Similarly, the set of states represented by $\langle e_0 \ldots e_n \rangle \leftarrow \text{post}$ is given as:

$$[\![\langle e_0 \ldots e_n \rangle \leftarrow \text{post}]\!] = \{ s' \in [\![Inv]\!] \mid \exists_s \in [\![\text{post}]\!] \cdot \exists a_0 \ldots a_n \cdot \delta^*(s', e_0 \ldots e_n, a_0 \ldots a_n, s) \}$$

Note the transposition of s and s' in the above two definitions, which otherwise have identical form. Note also that the semantics of these construct is parameterized on a transition function $\delta$ in addition to the set of variables V declared in the specification.

The dynamic semantics of a STS specification Spec is given by defining a satisfaction relation $\models$ between the universe of transition systems $[\![Spec]\!]$ and transition declarations of the STS specification.

In the sequel, the static-semantics described above are used. For the sake of readability, the subscripts in the bracket notation are dropped where it can be understood by context. An auxiliary $\models_\Theta$ relation is defined on state components that will be used in the semantic definitions of an STS.

For the definition of $\models_\Theta$ for states, a state $s \in S_\Theta$ satisfies a predicate pred is given as:

$$s \models_\Theta \text{pred} \triangleq s \in [\![\text{pred}]\!]$$

The semantics of a transition declaration in an STS specification is now presented. These declarations form the dynamic component of the STS language, and specify constraints on the transition relation of transition systems. As discussed above, the dynamic semantics is given by a relation $\models$ between transition systems and transition declarations in the STS as:

$$\Theta \models \langle \text{Transition Declaration} \rangle$$

The notation $\models$ is defined inductively over the structure of transition declarations in the STS.

For simple transitions:

$$\Theta \models (p_1, e, a, p_2) \triangleq \forall (s_1, \text{evt}, \text{act}, s_2) \in \delta_\Theta : (s_1 \models \Theta p_1 \wedge \text{evt} = e) \Rightarrow (s_2 \models \Theta p_2 \wedge \text{act} = a)$$

The value $\Theta$ satisfies a sub-space transition declaration if the restricted transition system, such that all of its states satisfy the declared state predicate, satisfies the transition declaration.

$$\Theta \models \text{sun}(p)\langle T_1, T_2, \ldots, T_n \rangle \triangleq \Theta^{sub_p} \models \langle T_1, T_2, \ldots, T_n \rangle$$

Where $\Theta^{sub_p}(S_\Theta^{sub_p}, \Sigma\text{Evt}_\Theta^{sub_p}, \Sigma\text{Act}_\Theta^{sub_p}, \delta_\Theta^{sub\ p})$ gives a restricted transition of $\Theta$ with respect to predicate p such that $\Theta^{sub_p} \models p$, $\Sigma\text{Evt}_\Theta^{sub_p} = \Theta_\Sigma\text{Evt}$, $\Sigma\text{Act}_\Theta^{sub_p} = \Theta_\Sigma^{Act}$ and $\delta_\Theta^{sub_p} = \{(s, e, a, s') \in \delta_\Theta \mid s \in [\![p]\!] \wedge s' \in [\![p]\!]\}$.

The notation $\Theta$ satisfies an abstract transition declaration if the abstraction $\Theta$ with respect to the predicates given in the declaration satisfies transition declaration.

$$\Theta \models \text{abstract}\langle \overrightarrow{v_1;p_1} \rangle \langle T_1, T_2, \ldots, T_n \langle\rangle \Theta \pi\stackrel{\triangleq}{_1}\overrightarrow{\stackrel{v}{_1}}\rangle \models \langle T_1, T_2, \ldots, T_n \rangle$$

Here $\Theta\#\langle \overrightarrow{v_i;p_i} \rangle$ is the standard abstraction of the transition system $\Theta$. A couple of auxiliary definitions are provided before defining the abstraction of a transition system.

For the definition of abstraction, given a transition system $\Theta$ and a concrete state $s \in S_\Theta$, the abstraction of the state $$s \xrightarrow{\#}_{pred_i}$$

is represented as an assignment of truth-values to $v_i$ that matches with the satisfiability of $pred_i$ by the state s.

$$s \xrightarrow{\#}_{v_i:pred_i} = \langle v_i \mapsto \text{true} \leftrightarrow s \mid =_\Theta pred_i \rangle$$

In the sequel, the canonical extension of this definition can be used for sets of states.

For the definition of abstraction of transition relation given a concrete transition relation, $\delta$, the abstraction of $\delta$ with respect to the abstraction $v_i$: $pred_i$, written $$s \xrightarrow{\#}_{v_i:pred_i}$$

is given as:

$$s \xrightarrow{\#}_{v_i:pred_i} = \left\{ \left( s \xrightarrow{\#}_{v_i:pred_i}, e, a, s' \xrightarrow{\#}_{v_i:pred_i} \right) \middle| (s, e, a, s') \in \delta \right\}$$

For the definition of predicate abstraction, given a transition system:

$$\Theta \equiv \langle S, \Sigma^{Evt}, \Sigma^{Act}, \text{Init}, \delta \rangle$$

And an abstraction specification:

$$\langle \overrightarrow{v_i : p_i} \rangle$$

Consisting of a sequence of predicates $p_i$ and (fresh) variables $v_i$ the abstraction $\Theta^\#$ is defined as follows:

$$\Theta^\# \equiv \langle S^\#, \sum\nolimits^{Evt}, \sum\nolimits^{Act}, \text{Init}^\#, \delta^\# \rangle$$

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing specification requirements for a structured transition system employing state machines, said method performed using a state machine processor, and comprising:
   providing a sub-state based structuring mechanism that allows users to focus on the behavior with respect to a sub-set of states;
   providing an abstraction based structuring mechanism that allows users to specify requirements by conflating different states;
   providing a partial behaviors structuring mechanism that allows specification of transitions using scenarios; and
   employing the sub-state based structuring mechanism, the abstraction based structuring mechanism and the partial behaviors structuring mechanism to provide the writing requirements and define syntax and semantics of the system.

2. The method according to claim 1 further comprising providing a decomposition structuring mechanism that operates to reduce the complexity of a large state machine into smaller inter-related state machines, said decomposition structuring mechanism also being employed to provide the writing requirements and define the syntax and semantics of the system.

3. The method according to claim 1 further comprising providing a structured sequence of declarations that define the syntax of the system.

4. The method according to claim 3 wherein the structured sequence of declarations includes type declarations, variable declarations, event declarations, action declarations, invariant declarations, initialization declarations and transition declarations.

5. The method according to claim 3 wherein one of the declarations is a transition declaration including a plurality of syntax elements.

6. The method according to claim 5 wherein the syntax elements include a sub-space syntax element that describes the transition behavior with respect to a set of states using a predicate and an abstraction syntax element that specifies an over-approximation of the behavior of a specification of the system.

7. The method according to claim 5 wherein the transition declaration includes source and target states selected from the group consisting of initial states, state predicates, post image states of a sequence of events and pre-image states of a sequence of events with respect to a given set of states.

8. The method according to claim 1 wherein the state machines are on a vehicle.

9. A method for providing specification requirements for a structured transition system employing state machines on a vehicle, said method performed using a state machine processor, comprising:
   providing a sub-state based structuring mechanism that allows users to focus on the behavior with respect to a sub-set of states;
   providing an abstraction based structuring mechanism that allows users to specify requirements by conflating different states;
   providing a partial behaviors structuring mechanism that allows specification of transition by using scenarios;
   providing a decomposition structuring mechanism that allows reducing the complexity of a large state machine into smaller inter-related state machine;
   providing a structured sequence of declarations that define the syntax of the system; and
   employing the sub-state based structuring mechanism, the abstraction based structuring mechanism, the partial behaviors structuring mechanism and the decomposition structuring mechanism to provide the writing requirements and to define the syntax and semantics of the system.

10. The method according to claim 9 wherein the structured sequence of declarations includes type declarations, variable declarations, event declarations, action declarations, invariant declarations, initialization declarations and transition declarations.

11. The method according to claim 9 wherein one of the declarations is a transition declaration including a plurality of syntax elements.

12. The method according to claim 11 wherein the syntax elements include a sub-space syntax element that describes the transition behavior with respect to a set of states using a predicate and an abstraction syntax element that specifies an over-approximation of the behavior of a specification of the system.

13. The method according to claim 11 wherein the transition declaration includes source and target states selected from the group consisting of initial states, state predicates, post image states of a sequence of events and pre-image states of a sequence of events with respect to a given set of states.

14. A method for providing specification requirements for a structured transition system employing state machines, said method performed using a state machine processor, and comprising:
providing a plurality of structuring mechanisms that reduce the complexity of the state machines and the states employed in the state machines; and
using the plurality of structuring mechanisms to provide the writing requirements and providing syntax and semantics of the system wherein the plurality of structuring mechanisms include a sub-state based structuring mechanism, a partial behaviors structuring mechanism and a decomposition structuring mechanism.

15. The method according to claim 14 further comprising providing a structured sequence of declarations that define the syntax of the system.

16. The method according to claim 15 wherein the structured sequence of declarations includes type declarations, variable declarations, event declarations, action declarations, invariant declarations, initialization declarations and transition declarations.

17. The method according to claim 15 wherein one of the declarations is a transition declaration including a plurality of syntax elements.

18. The method according to claim 17 wherein the syntax elements include a sub-space syntax element that describes the transition behavior with respect to a set of states using a predicate and an abstraction syntax element that specifies an over-approximation of the behavior of a specification of the system.

19. The method according to claim 17 wherein the transition declaration includes source and target states selected from the group consisting of initial states, state predicates, post image states of a sequence of events and pre-image states of a sequence of events with respect to a given set of states.

* * * * *